(12) United States Patent
Chen

(10) Patent No.: US 11,599,120 B2
(45) Date of Patent: Mar. 7, 2023

(54) OBSTACLE DETECTING METHOD, APPARATUS, DEVICE AND COMPUTER STORAGE MEDIUM

(71) Applicant: BEIJING BAIDU NETCOM SCIENCE AND TECHNOLOGY CO., LTD., Beijing (CN)

(72) Inventor: Chen Chen, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 166 days.

(21) Appl. No.: 16/711,246

(22) Filed: Dec. 11, 2019

(65) Prior Publication Data
US 2020/0183409 A1 Jun. 11, 2020

(30) Foreign Application Priority Data
Dec. 11, 2018 (CN) .......................... 201811510344.1

(51) Int. Cl.
*G05D 1/02* (2020.01)
*G06K 9/62* (2022.01)
(Continued)

(52) U.S. Cl.
CPC .......... *G05D 1/0238* (2013.01); *G05D 1/0077* (2013.01); *G06K 9/6288* (2013.01); *G06V 20/58* (2022.01); *G05D 2201/0213* (2013.01)

(58) Field of Classification Search
CPC .............. G05D 1/0238; G05D 1/0077; G05D 2201/0213; G06K 9/00805; G06K 9/6288
See application file for complete search history.

(56) References Cited

U.S. PATENT DOCUMENTS

| 9,558,667 | B2 * | 1/2017 | Bowers | G08G 1/16 |
| 2011/0166784 | A1 * | 7/2011 | Tyrrell | G01C 21/26 |
| | | | | 701/469 |

(Continued)

FOREIGN PATENT DOCUMENTS

| CN | 102303605 A | 1/2012 |
| CN | 105389984 A | 3/2016 |

(Continued)

OTHER PUBLICATIONS

Search Report for Chinese application No. 201811510344.1, dated Jul. 19, 2019 with English translation provided by Google Translate.

(Continued)

*Primary Examiner* — Dale W Hilgendorf
*Assistant Examiner* — Frank T Glenn, III
(74) *Attorney, Agent, or Firm* — Ladas & Parry, LLP

(57) ABSTRACT

An obstacle detecting method, apparatus, device and computer storage medium are proposed. The method includes: obtaining data acquired by a plurality of sensors installed on a vehicle at the same time; combining the data acquired at the same time to obtain a data set corresponding to the time; and performing obstacle detection based on the data set to obtain obstacle information. The technical solution may reduce financial costs and enrich information amount of the data, and may simplify the obstacle detecting steps, and avoid the problem about failure to fuse data in different formats, and thereby further improve the vehicle's travel safety.

13 Claims, 2 Drawing Sheets

(51) Int. Cl.
    *G05D 1/00*         (2006.01)
    *G06V 20/58*     (2022.01)

(56)           References Cited

U.S. PATENT DOCUMENTS

| | | | |
|---|---|---|---|
| 2017/0190331 A1* | 7/2017 | Gupta | G05D 1/0088 |
| 2017/0220854 A1* | 8/2017 | Yang | G06K 9/6267 |
| 2018/0107214 A1* | 4/2018 | Chandy | B60W 40/08 |
| 2018/0232947 A1* | 8/2018 | Nehmadi | G01S 7/295 |
| 2018/0308026 A1* | 10/2018 | Sinha | G06Q 10/0635 |
| 2019/0086549 A1* | 3/2019 | Ushani | G05D 1/0088 |
| 2019/0130200 A1* | 5/2019 | Stent | G06V 10/806 |
| 2020/0158876 A1* | 5/2020 | Karadeniz | G05D 1/0088 |

FOREIGN PATENT DOCUMENTS

| | | |
|---|---|---|
| CN | 106908783 A | 6/2017 |
| CN | 108140322 A | 6/2018 |
| WO | 2018158712 A1 | 9/2018 |

OTHER PUBLICATIONS

First Office Action issued in Chinese application No. 201811510344.1, dated Jul. 26, 2019 with English translation provided by Google Translate.
Second Office Action issued in Chinese application No. 201811510344.1, dated Oct. 11, 2019 with English translation provided by Google Translate.

* cited by examiner

OBSTACLE DETECTING METHOD, APPARATUS, DEVICE AND COMPUTER STORAGE MEDIUM

CROSS REFERENCE TO RELATED APPLICATIONS

The present application claims the priority of Chinese Patent Application No. 201811510344.1, filed on Dec. 11, 2018, with the title of "obstacle detecting method, apparatus, device and computer storage medium". The disclosure of the above application is incorporated herein by reference in its entirety.

FIELD

The present disclosure relates to the technical field of autonomous driving, and particularly to an obstacle detecting method, apparatus, device and computer storage medium.

BACKGROUND

In the existing autonomous vehicles, in order to avoid the case in which the autonomous vehicle has a blind spot so that obstacles located in the blind spot cannot be detected, a method of arranging a plurality of sensors on the autonomous vehicle is generally employed to completely sense all obstacles around the vehicle.

However, in the related art, when a plurality of sensors are used for obstacle detection, there are the following problems: when multiple sensors of the same type are used for obstacle detection, if relatively expensive sensors are used, data in a broader scope and with a larger amount of information can be obtained, but huge financial costs will be consumed; if relatively cheap sensors are used, although less financial costs are consumed, data in a broader scope and with a larger amount of information cannot be obtained; when different types of sensors are used for obstacle detection, output data of multiple sensors are usually fused, so the obstacle-detecting steps are cumbersome; furthermore, when the number of sensors is too large, the problem of fusion failure is very likely to occur. Once the data fusion fails, obstacles around the vehicle cannot be detected, which therefore substantially affects the travel safety of the vehicle.

SUMMARY

In view of the above, the present disclosure provides an obstacle detecting method, apparatus, device and computer storage medium, which may reduce financial costs and enrich information amount of the data, and may simplify the obstacle detecting steps, and avoid the problem about failure to fuse data in different formats, and thereby further improve the vehicle's travel safety.

According to an embodiment of the present disclosure, a technical solution employed by the present disclosure to solve the technical problem proposes an obstacle detecting method. The method includes: obtaining data acquired at the same time by a plurality of sensors installed on a vehicle; combining the data acquired at the same time to obtain a data set corresponding to the time; and performing obstacle detection based on the data set to obtain obstacle information.

According to an embodiment of the present disclosure, the plurality of sensors are different types of sensors and respectively installed at different positions of a body of the vehicle.

According to an embodiment of the present disclosure, the obtaining data acquired at the same time by a plurality of sensors installed on a vehicle may include: obtaining data acquired by the plurality of sensors at the same time at a preset time interval.

According to an embodiment of the present disclosure, the obtaining data acquired at the same time by a plurality of sensors installed on a vehicle may include: creating a data thread for each of the plurality of sensors, where the data thread records data acquired by the sensor and acquisition time of respective data; determining an acquisition time of respective data in the data thread for a preset sensor as a reference time; and extracting data corresponding to the reference time from each data thread, and taking the extracted data as the data acquired at the same time.

According to an embodiment of the present disclosure, before combining the data acquired at the same time, the method may further include: converting a coordinate system for the data acquired by each of the plurality of sensors at the same time into a target coordinate system, according to a preset conversion relationship between the coordinate system and the target coordinate system.

According to an embodiment of the present disclosure, the combining the data acquired at the same time to obtain a data set corresponding to the time may include: determining data format of the data acquired by each of the plurality of sensors; fusing data in a same data format, and obtaining fused data in different data formats; writing the fused data in different data formats respectively into corresponding storage locations in a preset set, to obtain the data set corresponding to the time, where the preset set includes each data format and a storage location corresponding to the data format.

According to an embodiment of the present disclosure, the combining the data acquired at the same time to obtain a data set corresponding to the time may include: obtaining identification information corresponding to respective data; and according to the identification information corresponding to respective data, writing the respective data into corresponding storage locations in a preset set, to obtain the data set corresponding to the time, where the preset set includes each identification information and a storage location corresponding to the identification information.

According to an embodiment of the present disclosure, the performing obstacle detection according to the data set to obtain obstacle information may include: determining a detection method corresponding to each data in the data set according to a correspondence relationship between preset data formats and detection methods; and detecting the data in the corresponding format by the determined detection method to obtain the obstacle information.

According to an embodiment of the present disclosure, a technical solution employed by the present disclosure to solve the technical problem proposes an obstacle detecting apparatus. The apparatus includes: an obtaining unit for obtaining data acquired at the same time by a plurality of sensors installed on a vehicle; a combining unit for combining the data acquired at the same time to obtain a data set corresponding to the time; and a processing unit for performing obstacle detection based on the data set to obtain obstacle information.

According to an embodiment of the present disclosure, the plurality of sensors are different types of sensors and respectively installed at different positions of a body of the vehicle.

According to an embodiment of the present disclosure, upon obtaining data acquired at the same time by a plurality of sensors installed on a vehicle, the obtaining unit performs: obtaining data acquired by the plurality of sensors at the same time at a preset time interval.

According to an embodiment of the present disclosure, upon obtaining data acquired at the same time by a plurality of sensors installed on a vehicle, the obtaining unit performs: creating a data threads for each of the plurality of sensors, where the data thread records data acquired by the sensor and acquisition time of respective data; determining an acquisition time of respective data in the data thread for a preset sensor as a reference time; and extracting data corresponding to the reference time from each data thread, and taking the extracted data as the data acquired at the same time.

According to an embodiment of the present disclosure, before combining the data acquired at the same time, the combining unit further performs: converting a coordinate system for the data acquired by each of the plurality of sensors at the same time into a target coordinate system, according to a preset conversion relationship between the coordinate system and the target coordinate systems.

According to an embodiment of the present disclosure, upon combining the data acquired at the same time to obtain a data set corresponding to the time, the obtaining unit performs: determining data format of the data acquired by each of the plurality of sensors; fusing data in a same data format, and obtaining fused data in different data formats; writing the fused data in different data formats respectively into corresponding storage locations in a preset set, to obtain the data set corresponding to the time, where the preset set includes each data format and a storage location corresponding to the data format.

According to an embodiment of the present disclosure, upon combining the data acquired at the same time to obtain a data set corresponding to the time, the obtaining unit performs: obtaining identification information corresponding to respective data; and according to the identification information corresponding to respective data, writing the respective data into corresponding storage locations in a preset set to obtain the data set corresponding to the time, where the preset set includes each identification information and a storage location corresponding to the identification information.

According to an embodiment of the present disclosure, upon performing obstacle detection according to the data set to obtain obstacle information, the processing unit may performs: determining a detection method corresponding to each data in the data set according to a correspondence relationship between preset data formats and detection methods; and detecting the data in the corresponding format by the determined detection method to obtain the obstacle information.

As may be seen from the above technical solutions, by obtaining a data set by combining the data acquired by a plurality of sensors at the same time and then performing obstacle detection according to the obtained data set, the present disclosure may reduce financial costs and enrich information amount of the data, and may simplify the obstacle detecting steps, and avoid the problem about failure to fuse data in different formats, and thereby further improve the vehicle's travel safety.

DETAILED DESCRIPTION OF EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "in response to determining" or "in response to detecting". Similarly, depending on the context, phrases "if . . . is determined" or "if . . . (stated condition or event) is detected" may be construed as "when . . . is determined" or "in response to determining" or "when . . . (stated condition or event) is detected" or "in response to detecting (stated condition or event)".

Figure 1:
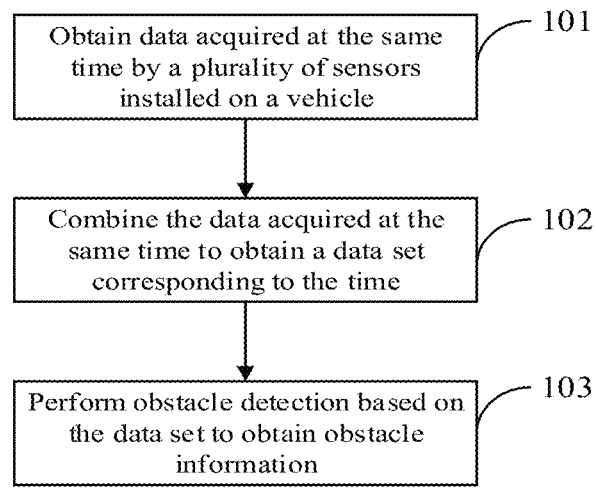
FIG. 1 is a flow chart of an obstacle detecting method according to an embodiment of the present disclosure.

FIG. 1 is a flow chart of an obstacle detecting method according to an embodiment of the present disclosure. As shown in FIG. 1, the method includes:

At 101, data acquired at the same time by a plurality of sensors installed on the vehicle are obtained.

In the present disclosure, a plurality of sensors are respectively installed at different positions of the vehicle body to completely sense all obstacles around the vehicle, for example installed on the roof, the front and the rear of the vehicle, both sides of the vehicle body and the bottom of the vehicle, or installed in a known blind spot of the vehicle, thereby ensuring that the vehicle may completely sense all the obstacles around the vehicle during the travel. Preferably, the vehicle in the present disclosure is an autonomous vehicle.

In addition, the types and the number of sensors installed at different positions are not limited. For example, the types of the sensors may be at least one of a laser radar, an ultrasonic radar, a millimeter wave radar, a camera, and the like. The number of sensors installed at the same position may be one or more. For example, one 16-line laser radar is installed on the roof of the vehicle, one high-definition camera is installed on each of the front, the rear and both sides of the vehicle, and two ultrasonic radars are installed on the bottom of the vehicle.

Therefore, the present disclosure may greatly reduce the financial cost as compared with the case that a plurality of laser radars are installed on the vehicle body. The present disclosure may obtain data in a larger scope and with a larger amount of information as compared with the case that a plurality of ultrasonic radars are installed on the vehicle body.

In this step, the data acquired at the same time by a plurality of sensors installed on the vehicle is obtained, namely, time synchronization is performed for data acquired by respective sensors to ensure time consistency of the obtained data.

This is because respective sensors may acquire all the data around the vehicle in real time during the travel of the vehicle, but since frequencies at which respective sensors acquire data are different, if time synchronization is not performed for data acquired by respective sensors, data will deviate in time so that obstacles faced by the vehicle at a certain moment cannot be accurately detected.

Specifically, in this step, when data acquired by the plurality of sensors at the same time are obtained, data acquired by the plurality of sensors at the same time may be obtained according to a preset time interval, where the preset time interval may be 1 second, 20 seconds, 50 seconds, 1 minute or the like, and is not limited by the present disclosure.

For example, if the preset time interval is 1 minute, at a time interval of 1 minute, data acquired by each sensor at 14:22 when the vehicle travels is obtained, then data acquired by each sensor at 14:23 when the vehicle travels is obtained, and then data acquired by each sensor at 14:24 when the vehicle travels is obtained, and so on so forth.

In addition, in this step, the following manner may further be employed when data acquired at the same time by the plurality of sensors installed on the vehicle are obtained: creating a data thread for each of the plurality of sensors, the data thread records data acquired by the sensor and acquisition time of respective data;
determining an acquisition time of respective data in the data thread for a preset sensor as a reference time; and obtaining data corresponding to the reference time from each data thread, and taking the obtained data as the data acquired at the same time. In other words, in this step, the data acquired by the plurality of sensors at the same acquisition time are obtained with the acquisition time when a preset sensor acquires data as the reference.

For example, a data thread is established for each of sensor 1, sensor 2, and sensor 3. If the acquisition time in the data thread for the sensor 1 is used as the reference, if the acquisition time in the data thread for the sensor 1 is 14:23:33, 14:23:43 and 14:23:53 respectively, data acquired at 14:23:33, 14:23:43 and 14:23:53 are respectively further obtained from the data thread for each of the sensor 2 and sensor 3.

At 102, the data acquired at the same time are combined to obtain a data set corresponding to the time.

In this step, the data acquired by the respective sensors at the same time and obtained in step 101 are combined to obtain a data set corresponding to the time. In other words, in this step, data acquired at the same time are combined to obtain a data set containing respective data.

Where, the step may further include the following content before combining data acquired at the same time: converting a coordinate system for the data acquired by each of the plurality of sensors at the same time into a target coordinate system, according to a preset conversion relationship between the coordinate system and the target coordinate system. The target coordinate system may be a world coordinate system or a coordinate system set by the user. It may be understood that performing coordinate system conversion for the data may ensure spatial consistency of the data acquired by respective sensors.

Specifically, this step may employ the following manner upon combining the data acquired at the same time to obtain a data set corresponding to the time: determining data format of the data acquired by each of the plurality of sensors; fusing data in a same data format, and obtaining fused data in different data formats; writing the fused data in different data formats respectively into corresponding storage locations in a preset set, to obtain the data set corresponding to the time, where the preset set includes each data format and a storage location corresponding to the data format.

For example, suppose that the data format of the acquired data is data 1 in a PCL (Point Cloud Library) format corresponding to the laser radar and data 2 in a Point format corresponding to the ultrasonic radar, and suppose that the preset set includes a PCL format, a Point format and a RGB (Red, Green, Blue) format, the data set obtained in this step may be: [{PCL format: data 1}; {Point format: data 2}: {RGB format: empty}].

It may be understood that if the coordinate system conversion is not previously performed for the data acquired by the sensor, this step needs to perform coordinate system conversion for the data acquired by each sensor before fusing the data in the same data type, thereby performing data fusion based on the converted data.

In addition, this step may employ the following manner upon combining the data acquired at the same time to obtain a data set corresponding to the time: obtaining identification information corresponding to respective data, namely, obtaining identification information such as a preset number and a device model corresponding to sensors acquiring respective data; according to the identification information corresponding to respective data, writing the respective data into corresponding storage locations in a preset set, to obtain the data set corresponding to the time, where the preset set includes each identification information and a storage location corresponding to the identification information.

For example, suppose that the obtained identification information of data 1 is number 1, the identification information of data 2 is number 2 and the identification information of data 3 is number 3, this indicates that the data 1, the data 2 and the data 3 are acquired and obtained by sensors numbered 1, 2 and 3 respectively, and the data set obtained by this step may be: [{number 1: data 1}; {number 2: data 2}: {number 3: data 3}: {number 4: empty} . . . ].

In this step, when the data acquired at the same time are combined to obtain a data set corresponding to the time, the respective data may be directly put into a preset set to obtain the data set corresponding to the time.

In the related art, when obstacle detection is performed based on a plurality of obstacles, a manner of fusing a plurality of data acquired by the plurality of sensors into fused data is usually employed. Therefore, in the related art, the manner of detecting obstacles based on fusion of a plurality of data is cumbersome, and furthermore, the formats of data acquired by different sensors are different and probably cause fusion failure. Furthermore, once the fusion fails, the vehicle cannot perform obstacle detection, so that the vehicle's travel safety will be affected. In contrast, the manner of combining data to obtain the data set employed by the present disclosure may simplify the obstacle detecting steps, and may substantially avoid the problem about data fusion failure, and thereby further improve the vehicle's travel safety.

At 103, obstacle detection is performed based on the data set to obtain obstacle information.

In this step, the obstacle detection is performed based on the data set obtained in step 102, thereby obtaining obstacle information of the obstacles around the travelling vehicle.

The obtained obstacle information includes information such as obstacle type, obstacle size, and a distance of the obstacle from the vehicle.

Specifically, this step may employ the following manner upon performing obstacle detection according to the data set: determining a detection method corresponding to each data in the data set according to a correspondence relationship between preset data formats and detection methods; and detecting the data in the corresponding format by the determined detection method to obtain the obstacle information. The detection methods for detecting data in different formats are not limited in the present disclosure.

It may be understood that after obtaining the information of obstacles around vehicle, the vehicle may control the vehicle according to the obtained obstacle information, such as parking, decelerating, evading the obstacles or re-planning the route, thereby further improving the vehicle's travel safety.

Figure 2:
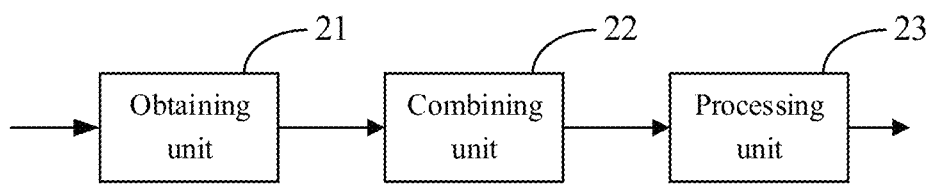
FIG. 2 is a block diagram of an obstacle detecting apparatus according to an embodiment of the present disclosure.

FIG. 2 is a block diagram of an obstacle detecting apparatus according to an embodiment of the present disclosure. As shown in FIG. 2, the apparatus includes: an obtaining unit 21, a combining unit 22, and a processing unit 23.

The obtaining unit 21 is configured to obtain data acquired at the same time by a plurality of sensors installed on the vehicle.

The obtaining unit 21 is configured to obtain data acquired at the same time by a plurality of sensors installed on the vehicle, namely, the obtaining unit 21 performs time synchronization for data acquired by respective sensors to ensure time consistency of the obtained data.

Specifically, upon obtaining data acquired by the plurality of sensors at the same time, the obtaining unit 21 may obtain data acquired by the plurality of sensors at the same time according to a preset time interval, where the preset time interval may be 1 second, 20 seconds, 50 seconds, 1 minute or the like, and is not limited by the present disclosure.

In addition, upon obtaining data acquired at the same time by the plurality of sensors installed on the vehicle, the obtaining unit 21 may employ the following manner: creating a data thread for each of the plurality to sensors, the data thread recording data acquired by the sensor and acquisition time of respective data; determining an acquisition time of respective data in the data thread for a preset sensor as a reference time; and obtaining data corresponding to the determined reference time from each data thread as the data acquired by the plurality of sensors at the same time. In other words, in this step, the data acquired by the plurality of sensors at the same acquisition time are obtained with the acquisition time when a preset sensor acquires data as the reference.

The combining unit 22 is configured to combine the data acquired at the same time to obtain a data set corresponding to the time.

The combining unit 22 combines the data acquired by respective sensors at the same time obtained by the obtaining unit 21 to obtain a data set corresponding to the time. In other words, the combining unit 22 combines data acquired at the same time to obtain a data set containing respective data.

Where, the combining unit 22 may further perform the following operation before combining the data acquired at the same time: converting a coordinate system for the data acquired by each of the plurality of sensors at the same time into a target coordinate system, according to a preset conversion relationship between the coordinate system and the target coordinate systems, where the target coordinate system may be a world coordinate system or a coordinate system set by the user. It may be understood that performing coordinate system conversion for the data may ensure spatial consistency of the data acquired by respective sensors.

Specifically, the combining unit 22 may employ the following manner upon combining the data acquired at the same time to obtain a data set corresponding to the time: determining data format of the data acquired by each of the plurality of sensors; fusing data in a same data format, and obtaining fused data in different data formats; writing the fused data in different data formats respectively into corresponding storage locations in a preset set, to obtain the data set corresponding to the time, where the preset set includes each data format and a storage location corresponding to the data format.

It may be understood that if the coordinate system conversion is not previously performed for the data acquired by the sensor, the combining unit 22 further needs to perform coordinate system conversion for the data acquired by each sensor before fusing the data in the same data type, thereby performing data fusion based on the converted data.

In addition, the combining unit 22 may employ the following manner upon combining the data acquired at the same time to obtain a data set corresponding to the time: obtaining identification information corresponding to respective data, namely, obtaining identification information such as a preset number and a device model corresponding to sensors acquiring respective data; according to the identification information corresponding to respective data, writing the respective data into corresponding storage locations in a preset set, to obtain the data set corresponding to the time, where the preset set includes each identification information and a storage location corresponding to the identification information.

Upon combining the data acquired at the same time to obtain a data set corresponding to the time, the combining unit 22 may directly put the respective data into a preset set to obtain the data set corresponding to the time.

The processing unit 23 is configured to perform obstacle detection based on the data set to obtain obstacle information.

The processing unit 23 performs the obstacle detection based on the data set obtained by the combining unit 22, thereby obtaining obstacle information of the obstacles around the travelling vehicle. The obtained obstacle information includes information such as obstacle type, obstacle size, and a distance of the obstacle from the vehicle.

Specifically, the processing unit 23 may employ the following manner upon performing obstacle detection according to the data set: determining a detection method corresponding to each data in the data set according to a correspondence relationship between preset data formats and detection methods; and detecting the data in the corresponding format by the determined detection method to obtain the obstacle information. The detection methods for detecting data in different formats are not limited in the present disclosure.

It may be understood that after obtaining the information of obstacles around vehicle, the vehicle may control the vehicle according to the obtained obstacle information, such as parking, decelerating, evading the obstacles or re-planning the route, thereby further improving the vehicle's travel safety.

Figure 3:
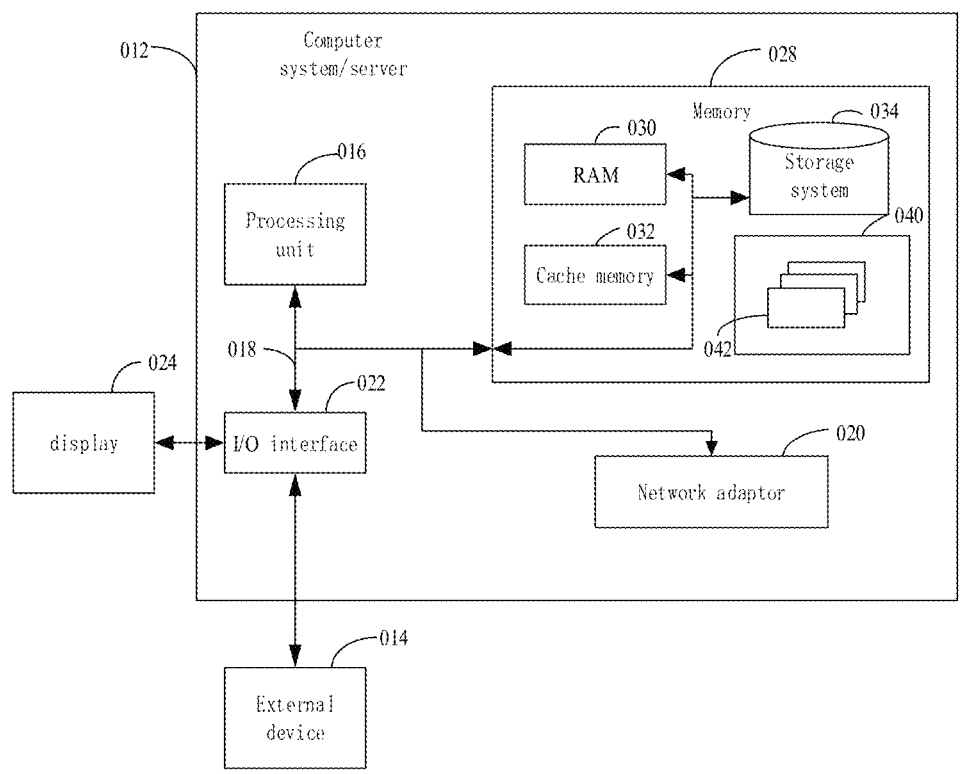
FIG. 3 is a block diagram of a computer system/server according to an embodiment of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the flow of the method provided by embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the flow of the method provided by the embodiments of the present disclosure is performed by the one or more processors.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

According to technical solutions according to the present disclosure, it is possible to mount a plurality of different types of sensors on the vehicle according to the user's actual needs, thereby achieving the purpose of reducing costs and enriching information amount of the data; in addition, the present disclosure, in a manner of combining the data acquired by a plurality of sensors at the same time to obtain a data set, can simplify the obstacle detecting steps, and can avoid the problem about failure to fuse data in different formats, and thereby further improve the vehicle's travel safety.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An obstacle detecting method, comprising:
    obtaining data acquired at a same time by a plurality of sensors installed on a vehicle for sensing an environment around the vehicle; wherein the plurality of sensors comprise a plurality of different types of sensors comprising one first sensor of a first type, at least two sensors of a second type, and at least two sensors of a third type, and wherein the data obtained by the first sensor of the first type have a first format, the data obtained by the at least two sensors of the second type have a second format, and the data obtained by the at least two sensors of the third type have a third format;
    combining the data acquired at the same time to obtain a data set corresponding to the time, comprising: fusing the data of the second format; fusing the data of the third format; and writing the data of the first format, the data of the second format obtained by fusing, and the data of the third format obtained by fusing into the data set; and
    performing obstacle detection using a first method corresponding to the first format with the data of the first format, using a second method corresponding to the second format with the data of the second format obtained by fusing, and using a third method corresponding to the third format with the data of the third format obtained by fusing, to obtain obstacle information, so that the vehicle is controlled according to obtained obstacle information.

2. The obstacle detecting method according to claim 1, wherein the plurality of sensors are respectively installed at different positions of a body of the vehicle.

3. The obstacle detecting method according to claim 1, wherein the obtaining data acquired at a same time by a plurality of sensors installed on a vehicle comprises:
    obtaining data acquired by the plurality of sensors at the same time at a preset time interval.

4. The obstacle detecting method according to claim 1, wherein the obtaining data acquired at a same time by a plurality of sensors installed on a vehicle comprises:
    creating a data thread for each of the plurality of sensors, wherein the data thread records data acquired by the sensor and acquisition time of the recorded data;
    determining an acquisition time of the recorded data in the data thread for a preset sensor as a reference time; and
    extracting data corresponding to the reference time from each data thread, and taking the extracted data as the data acquired at the same time.

5. The obstacle detecting method according to claim 1, wherein before combining the data acquired at the same time, the method further comprises:
    converting a coordinate system for the data acquired by each of the plurality of sensors at the same time into a target coordinate system, according to a preset conversion relationship between the coordinate system and the target coordinate system.

6. The obstacle detecting method according to claim 1, wherein the first sensor of the first type is a 16-line laser radar installed on a roof of the vehicle, the at least two sensors of the second type are four high-definition cameras installed respectively on a front, a rear and both sides of the vehicle, and the at least two sensors of the third type are two ultrasonic radars installed on a bottom of the vehicle.

7. A device, comprising:
    one or more processors;
    a storage for storing one or more programs,
    said one or more programs are executed by said one or more processors to enable said one or more processors to implement an obstacle detecting method, wherein the obstacle detecting method comprises:
    obtaining data acquired at a same time by a plurality of sensors installed on a vehicle for sensing an environment around the vehicle; wherein the plurality of sensors comprise a plurality of different types of sensors comprising one first sensor of a first type, at least two sensors of a second type, and at least two sensors of a third type, and wherein the data obtained by the first sensor of the first type have a first format, the data obtained by the at least two sensors of the second type have a second format, and the data obtained by the at least two sensors of the third type have a third format;

combining the data acquired at the same time to obtain a data set corresponding to the time comprising: fusing the data of the second format; fusing the data of the third format; and writing the data of the first format, the data of the second format obtained by fusing, and the data of the third format obtained by fusing into the data set; and performing obstacle detection using a first method corresponding to the first format with the data of the first format, using a second method corresponding to the second format with the data of the second format obtained by fusing, and using a third method corresponding to the third format with the data of the third format obtained by fusing, to obtain obstacle information, so that the vehicle is controlled according to obtained obstacle information.

8. The device according to claim 7, wherein the plurality of sensors are respectively installed at different positions of a body of the vehicle.

9. The device according to claim 7, wherein the obtaining data acquired at a same time by a plurality of sensors installed on a vehicle comprises:

obtaining data acquired by the plurality of sensors at the same time at a preset time interval.

10. The device according to claim 7, wherein the obtaining data acquired at a same time by a plurality of sensors installed on a vehicle comprises:

creating a data thread for each of the plurality of sensors, wherein the data thread records data acquired by the sensor and acquisition time of the recorded data;

determining an acquisition time of the recorded data in the data thread for a preset sensor as a reference time; and extracting data corresponding to the reference time from each data thread, and taking the extracted data as the data acquired at the same time.

11. The device according to claim 7, wherein before combining the data acquired at the same time, the method further comprises:

converting a coordinate system for the data acquired by each of the plurality of sensors at the same time into a target coordinate system, according to a preset conversion relationship between the coordinate system and the target coordinate system.

12. A non-transitory storage medium comprising computer-executable instructions, the computer-executable instructions, when executed by a computer processor, being used to implement an obstacle detecting method, wherein the obstacle detecting method comprises:

obtaining data acquired at a same time by a plurality of sensors installed on a vehicle for sensing an environment around the vehicle; wherein the plurality of sensors comprise a plurality of different types of sensors comprising one first sensor of a first type, at least two sensors of a second type, and at least two sensors of a third type, and wherein the data obtained by the first sensor of the first type have a first format, the data obtained by the at least two sensors of the second type have a second format, and the data obtained by the at least two sensors of the third type have a third format;

combining the data acquired at the same time to obtain a data set corresponding to the time comprising: fusing the data of the second format; fusing the data of the third format; and writing the data of the first format, the data of the second format obtained by fusing, and the data of the third format obtained by fusing into the data set; and performing obstacle detection using a first method corresponding to the first format with the data of the first format, using a second method corresponding to the second format with the data of the second format obtained by fusing, and using a third method corresponding to the third format with the data of the third format obtained by fusing, to obtain obstacle information, so that the vehicle is controlled according to obtained obstacle information.

13. The non-transitory storage medium according to claim 12, wherein the plurality of sensors are respectively installed at different positions of a body of the vehicle.

* * * * *